United States Patent
Lewis et al.

(10) Patent No.: US 9,207,834 B2
(45) Date of Patent: Dec. 8, 2015

(54) LAYERED MULTIMEDIA INTERACTIVE ASSESSMENT SYSTEM

(71) Applicant: eduPresent LLC, Fort Collins, CO (US)

(72) Inventors: Jeffrey S. Lewis, Fort Collins, CO (US); Robert J. Fiesthumel, Fort Collins, CO (US); Marna Deines, Brighton, CO (US); Jay D. Dokter, Loveland, CO (US)

(73) Assignee: eduPresent LLC, Fort Collins, CO (US)

( * ) Notice: Subject to any disclaimer, the term of this patent is extended or adjusted under 35 U.S.C. 154(b) by 106 days.

(21) Appl. No.: 13/842,846

(22) Filed: Mar. 15, 2013

(65) Prior Publication Data

US 2013/0332879 A1    Dec. 12, 2013

Related U.S. Application Data

(60) Provisional application No. 61/658,298, filed on Jun. 11, 2012.

(51) Int. Cl.
| | |
|---|---|
| G06F 3/00 | (2006.01) |
| G09B 7/00 | (2006.01) |
| G06F 3/0481 | (2013.01) |
| G09B 7/02 | (2006.01) |

(52) U.S. Cl.
CPC ............... *G06F 3/0481* (2013.01); *G09B 7/02* (2013.01)

(58) Field of Classification Search
USPC ................... 434/362, 350; 705/326; 715/78
See application file for complete search history.

(56) References Cited

U.S. PATENT DOCUMENTS

| | | | | |
|---|---|---|---|---|
| 6,018,768 A * | 1/2000 | Ullman | ............ | H04L 29/06 348/E7.024 |
| 6,144,991 A * | 11/2000 | England | ............ | G06F 17/30873 707/E17.111 |
| 6,154,631 A * | 11/2000 | Remschel | ............ | 434/350 |
| 6,381,444 B1 * | 4/2002 | Aggarwal | ............ | G09B 5/02 434/236 |
| 6,471,521 B1 * | 10/2002 | Dornbush et al. | ............ | 434/322 |
| 7,506,262 B2 | 3/2009 | Gupta et al. | | |
| 7,908,602 B2 | 3/2011 | Alcorn | | |
| 2002/0102523 A1 * | 8/2002 | Pelletier | ............ | G09B 7/00 434/323 |
| 2002/0106617 A1 * | 8/2002 | Hersh | ............ | G09B 7/02 434/236 |

(Continued)

FOREIGN PATENT DOCUMENTS

WO   2013/188290    12/2013

OTHER PUBLICATIONS iPhone_iOS4_User_Guide—2010—Excerpt.*

(Continued)

*Primary Examiner* — Stella E Higgs
(74) *Attorney, Agent, or Firm* — Craig R. Miles; CR Miles P.C.

(57) ABSTRACT

Generally, a computer implemented layered multimedia assessment system which provides one or more server computers that allow one or more client devices and one or more administrator devices access to an layered multimedia assessment application which provides an administrator user interface and client user interface which serially provide one or more assignment events each having a first step in which the client user interacts with the client user interface to perform an assessment of assignment content and performs an interactive examination and a second step in which the client user participates to evaluate the performance of other client users.

9 Claims, 11 Drawing Sheets

(56) References Cited

U.S. PATENT DOCUMENTS

| | | | |
|---|---|---|---|
| 2002/0115051 A1* | 8/2002 | Sanda | 434/350 |
| 2002/0172931 A1* | 11/2002 | Greene | G09B 7/00 434/322 |
| 2002/0182571 A1* | 12/2002 | McCormick | G09B 19/06 434/157 |
| 2003/0073064 A1 | 4/2003 | Riggs | |
| 2003/0073065 A1* | 4/2003 | Riggs | G09B 5/00 434/350 |
| 2003/0152904 A1* | 8/2003 | Doty, Jr. | G09B 7/00 434/350 |
| 2003/0174160 A1* | 9/2003 | Deutscher | H04N 5/44543 715/716 |
| 2004/0014021 A1* | 1/2004 | Suleiman | G09B 7/00 434/354 |
| 2004/0143630 A1 | 7/2004 | Kaufmann et al. | |
| 2004/0153504 A1 | 8/2004 | Hutchinson | |
| 2004/0153508 A1* | 8/2004 | Alcorn et al. | 709/205 |
| 2005/0048449 A1* | 3/2005 | Marmorstein | G09B 19/06 434/157 |
| 2005/0081159 A1* | 4/2005 | Gupta et al. | 715/751 |
| 2006/0111902 A1* | 5/2006 | Julia et al. | 704/236 |
| 2007/0074116 A1* | 3/2007 | Thomas | G11B 27/10 715/719 |
| 2008/0145832 A1* | 6/2008 | Lee | G09B 7/00 434/362 |
| 2008/0254425 A1* | 10/2008 | Cohen | 434/308 |
| 2008/0286739 A1* | 11/2008 | Umrigar | G09B 7/02 434/323 |
| 2009/0291426 A1* | 11/2009 | Polivka | G09B 7/00 434/350 |
| 2010/0153850 A1 | 6/2010 | Hariton | |
| 2010/0274847 A1* | 10/2010 | Anderson et al. | 709/203 |
| 2010/0293478 A1* | 11/2010 | Dahlgren | G09B 5/00 715/758 |
| 2011/0065070 A1* | 3/2011 | Duffy | G09B 7/00 434/159 |

OTHER PUBLICATIONS

U.S. Appl. No. 61/658,298, filed Jun. 11, 2012.
U.S. Appl. No. 61/407,548, filed Oct. 28, 2010.
U.S. Appl. No. 61/441,670, filed Feb. 11, 2011.
International Patent Cooperation Treaty Patent Application No. PCT/US2011/001820, filed Oct. 27, 2011.

* cited by examiner

LAYERED MULTIMEDIA INTERACTIVE ASSESSMENT SYSTEM

This United States Non-Provisional patent application claims the benefit of U.S. Provisional Patent Application No. 61/658,298, filed Jun. 11, 2012, hereby incorporated by reference herein.

I. FIELD OF THE INVENTION

Generally, a computer implemented layered multimedia assessment system which provides one or more server computers that allow one or more client devices and one or more administrator devices access to an layered multimedia assessment application which provides an administrator user interface and client user interface which serially provide one or more assignment events each having a first step in which the client user interacts with the client user interface to perform an assessment of assignment content and performs an interactive examination and a second step in which the client user participates to evaluate the performance of other client users.

II. BACKGROUND OF THE INVENTION

Currently, in the context of distance learning, there does not exist a computer implemented system which provides an administrator user interface which allows an administrator user to generate a plurality of assignment events and fill each with assignment content and which can be subsequently serially provided to a client user in the form of a first prompt and a second prompt which correspondingly divides the assignment event into a first step of assessment of assignment content and performance of an interactive examination and a second step in which the client user participates to evaluate the performance of other client users which have taken the same interactive examination.

III. SUMMARY OF THE INVENTION

Accordingly, a broad object of the invention can be to provide a layered multimedia assessment system and method which allows one or more client devices and one or more administrator devices access to a layered multimedia assessment application executable to generate an administrator user interface and client user interface on the corresponding graphical display surfaces. Each of the administrator user interface and the client user interface have an interactive structure which allows access to one or more assignment events in serial order each having a first step in which the client user interacts with the client user interface to perform an assessment of assignment content and performs an interactive examination and in a second step participates to evaluate the performance of other client users.

Another broad object of the invention can be to provide computer implemented method of layered multimedia assessment by which a client user in a first step assesses assignment content and performs an interactive examination and in a second step participates to evaluate the performance of other client users.

Another broad object of the invention can be to provide a first client user interface and corresponding administrator user interface for assignment selection structured to provide a first prompt and a second prompt which correspondingly generate for each assignment event a second client interface and a third client interface. The second client user interface concurrently displays an instruction image, a media image area, and an examination image area. The instruction image area provides instructions on assessment of the media image (which as to particular embodiments can include a video image and associated audio) and instructions in taking an interactive examination (which as to particular embodiments can be an oral examination). The third interactive graphic user interface includes the media image area, the instruction image area, and the examination image area associated with the same assignment event. The instruction image area provides instructions on assessment of other client user answers (or as to particular embodiments can be an assessment and rating of the oral examination video of other client users) for the same interactive examination.

Naturally, further objects of the invention are disclosed throughout other areas of the specification and drawings.

IV. BRIEF DESCRIPTION OF THE DRAWINGS

Figure 3:
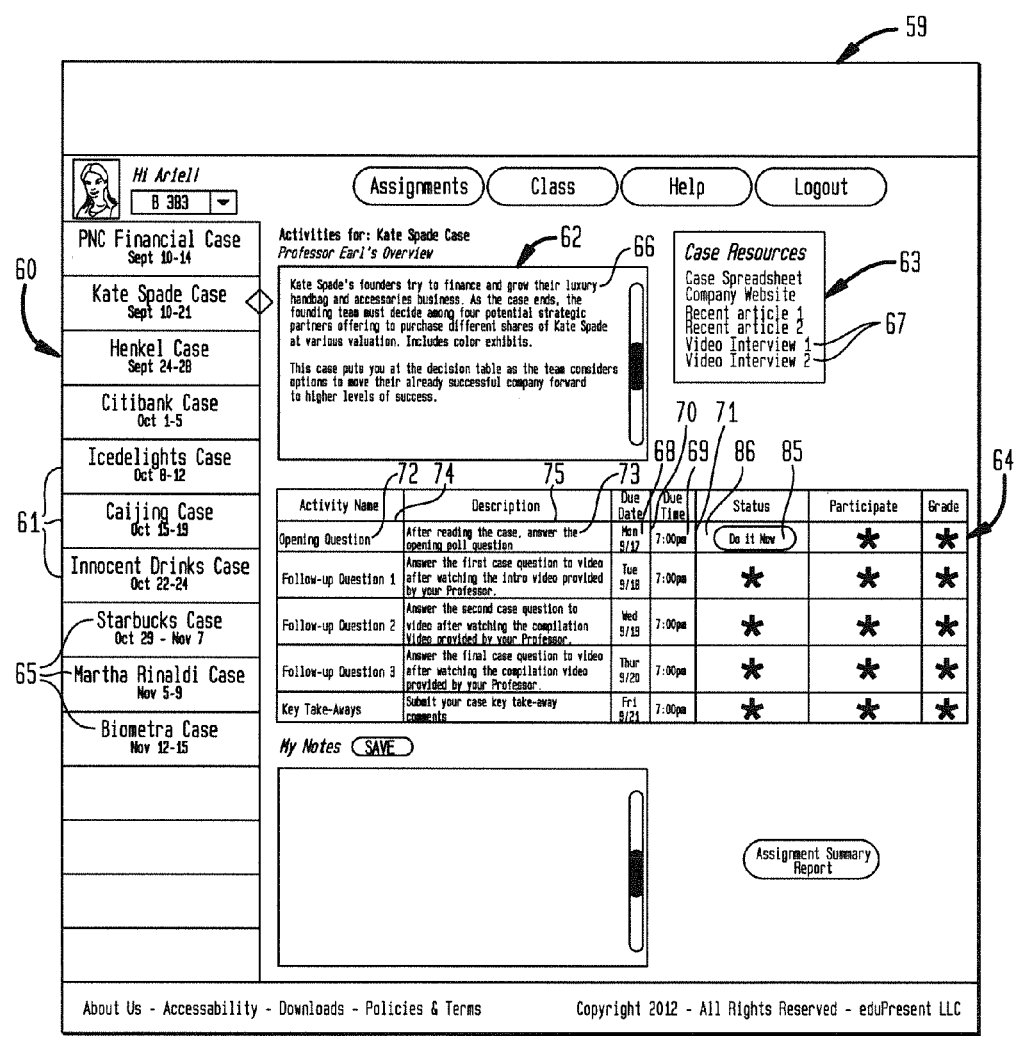

FIG. 3 shows a particular embodiment of a first client graphic user interface image which provides a format for displaying an assessment selection image area which provides one or more assessment identification areas, an assessment overview image area, an assessment resources image area, and an assignment events interface which operate to provide a first prompt and a second prompt to serially generate a second client graphic user interface image and a third user interface image in the layered multimedia assessment system.

Figure 4:
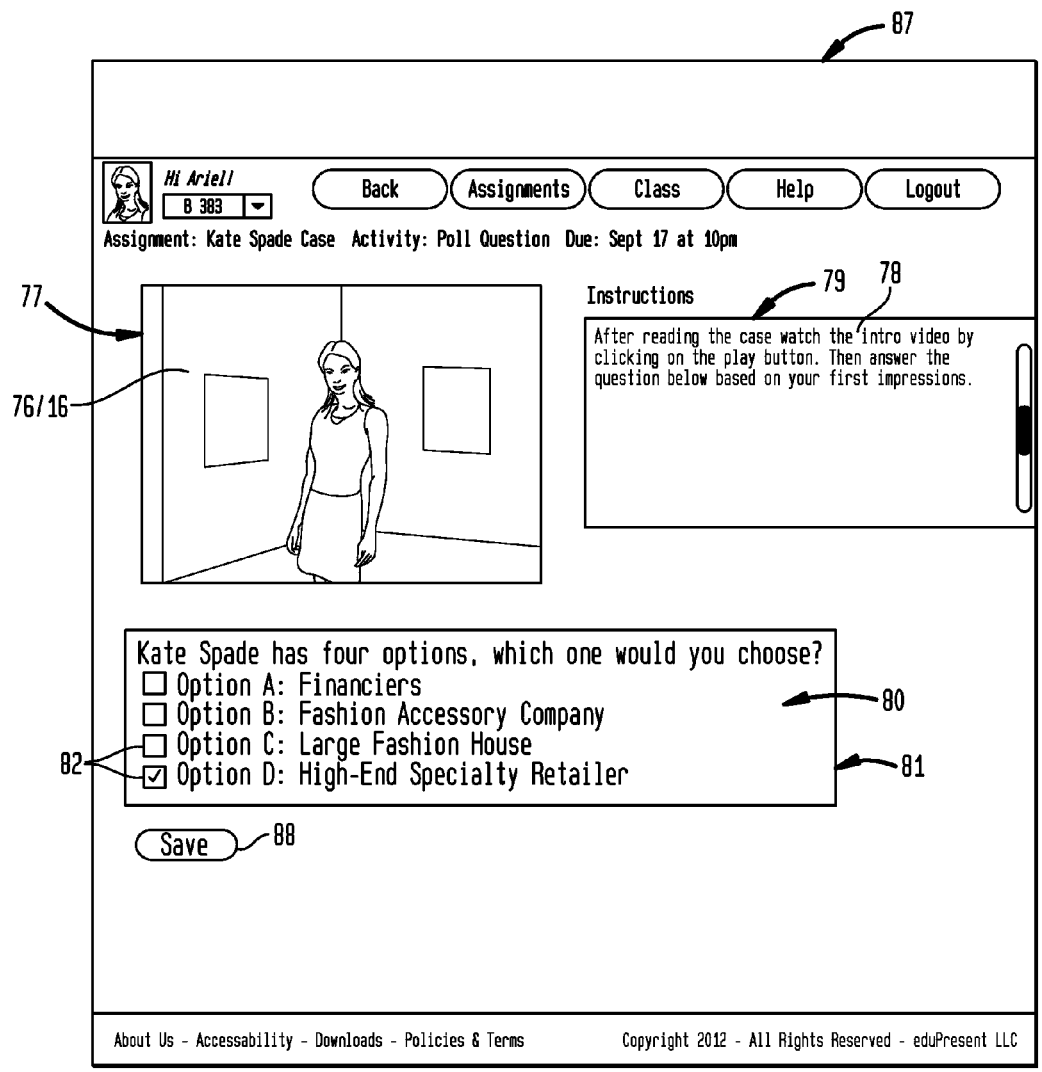

FIG. 4 shows a particular embodiment of second client graphic user interface generated by selection of the first prompt in a first assignment event which concurrently displays a media image area, an instruction image area and interactive examination image area which provides the interactive structure for the first step of an assignment event in the layered multimedia assessment system including assessment of assignment content and performance of an interactive examination.

Figure 5:
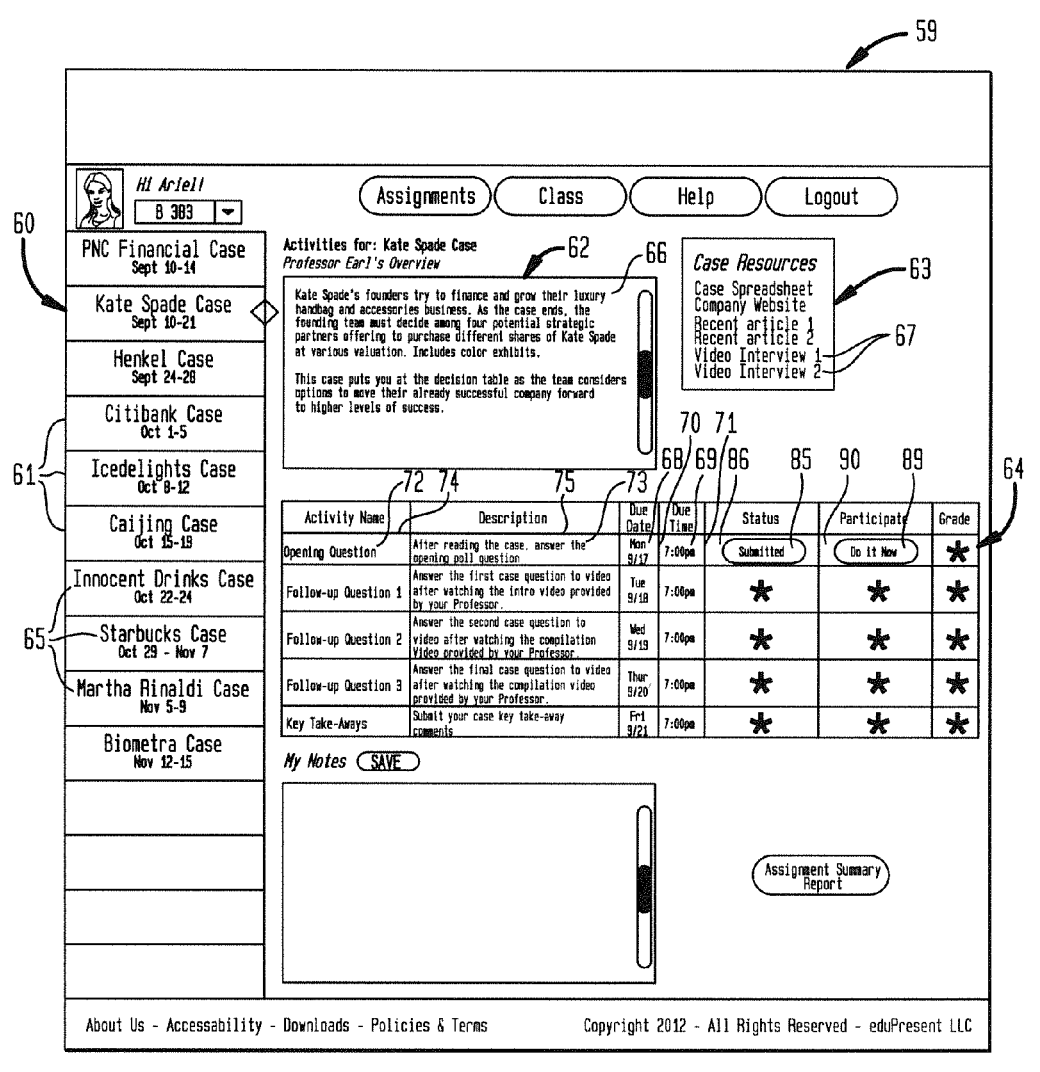

FIG. 5 shows a particular embodiment of a first client graphic user interface which further operates to serially provide the second prompt to generate a third client graphic user interface image which provides the interactive structure for the second step of an assignment event in the layered multimedia assessment system including participation to evaluate the performance of other client users who have taken the interactive examination.

Figure 6:
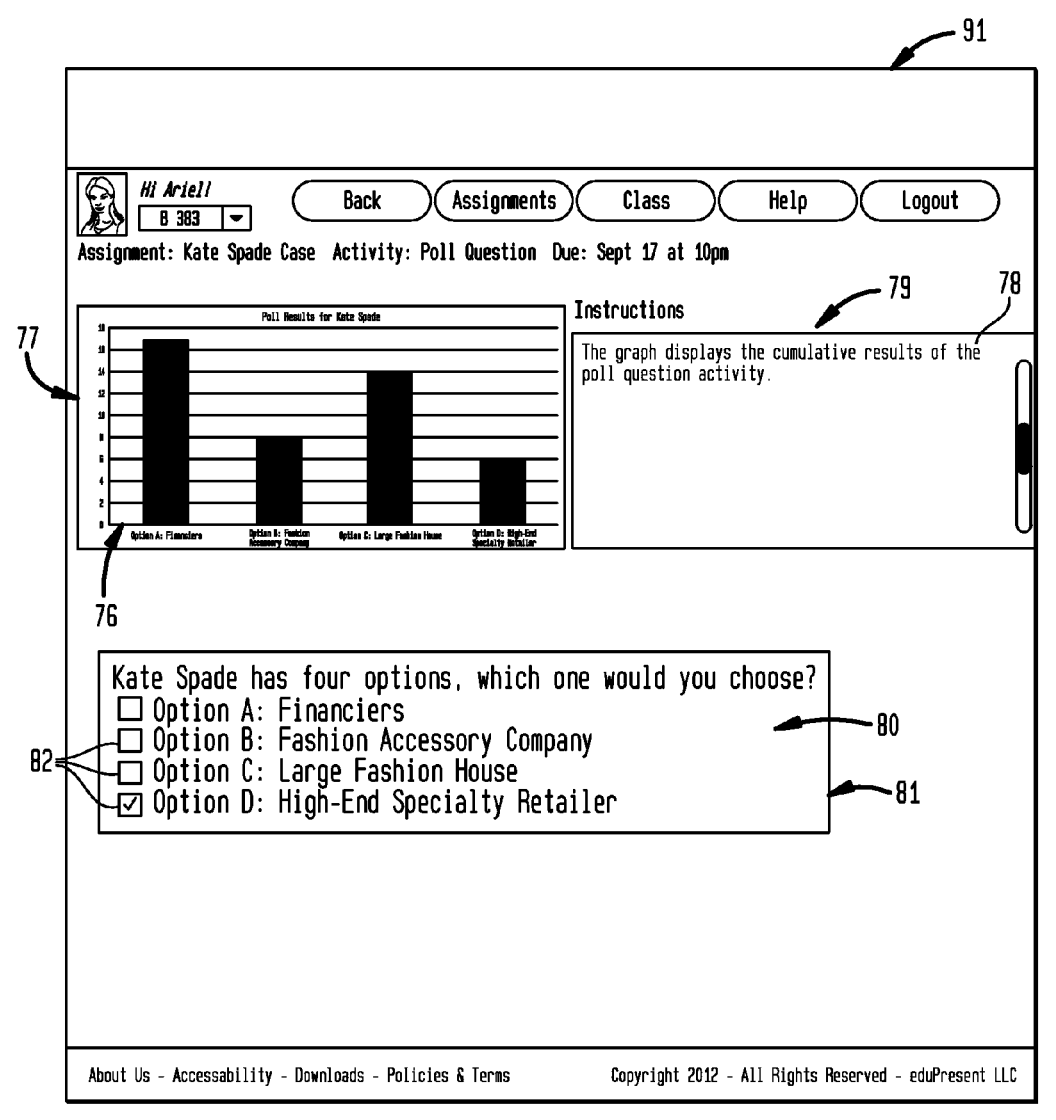

FIG. 6 shows a particular embodiment of third client graphic user interface which illustrates a format for concurrently displaying a media image area, an instruction image area and interactive examination image area which provides the interactive structure including participation to evaluate the performance of other client users who have taken the interactive examination.

Figure 7:
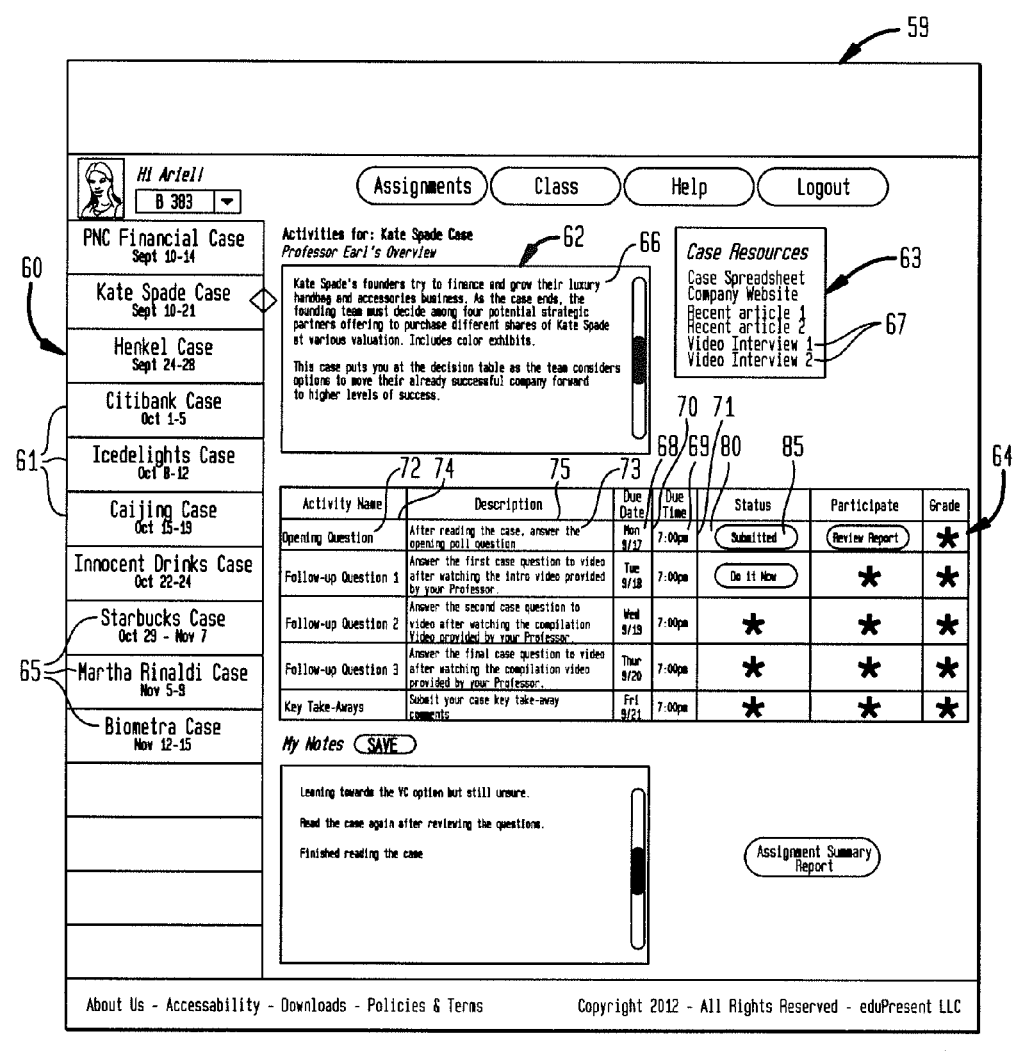

FIG. 7 shows a particular embodiment of the first client graphic user interface which further operates to provide an interactive structure which provides a first prompt in a second assignment event to generate a second client graphic user interface image in the layered multimedia assessment system.

Figure 8:
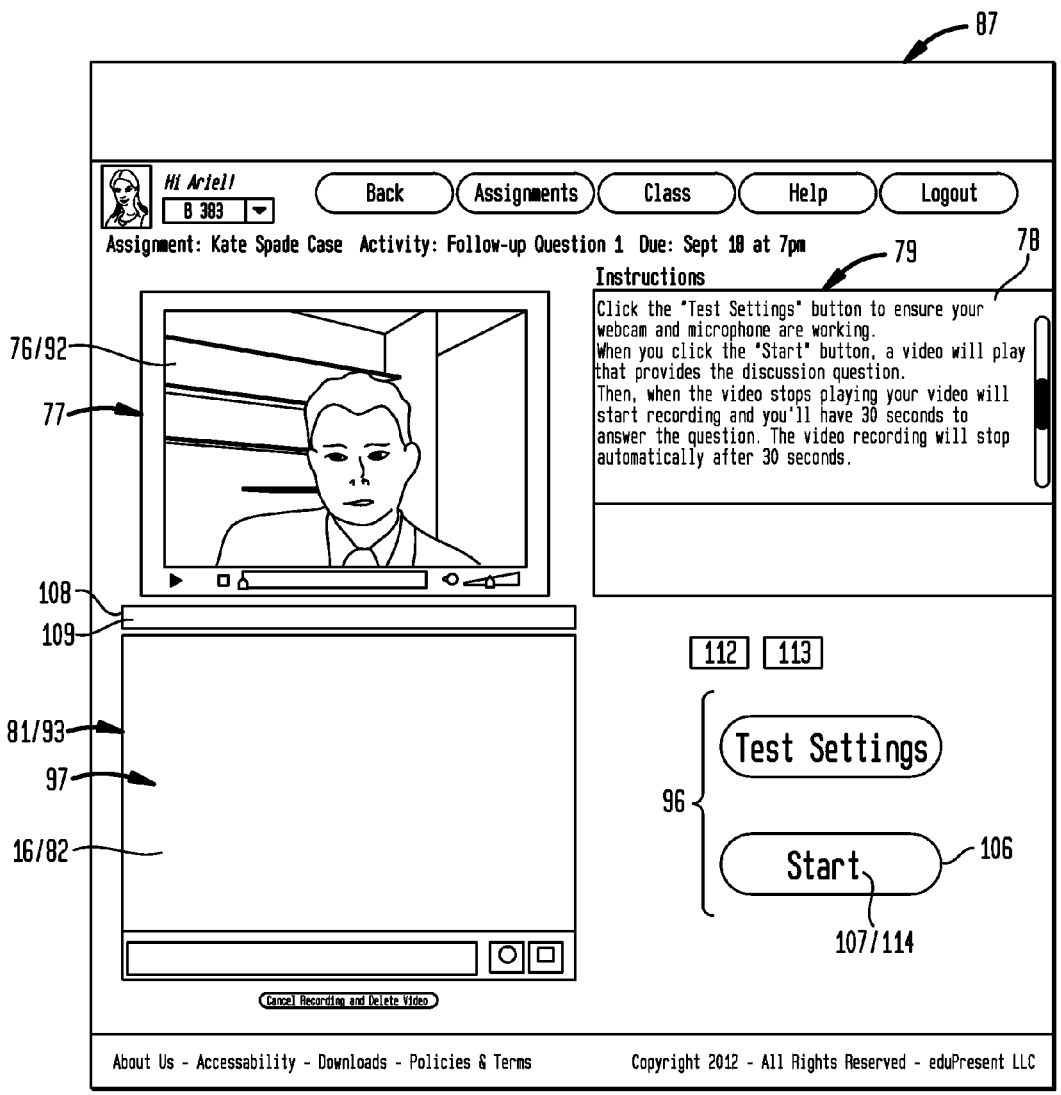

FIG. 8 shows a particular embodiment of second client graphic user interface which illustrates a format for concurrently displaying a media image area, an instruction image area and interactive examination image area which provides the structure for an interactive oral examination of the client user.

Figure 9:
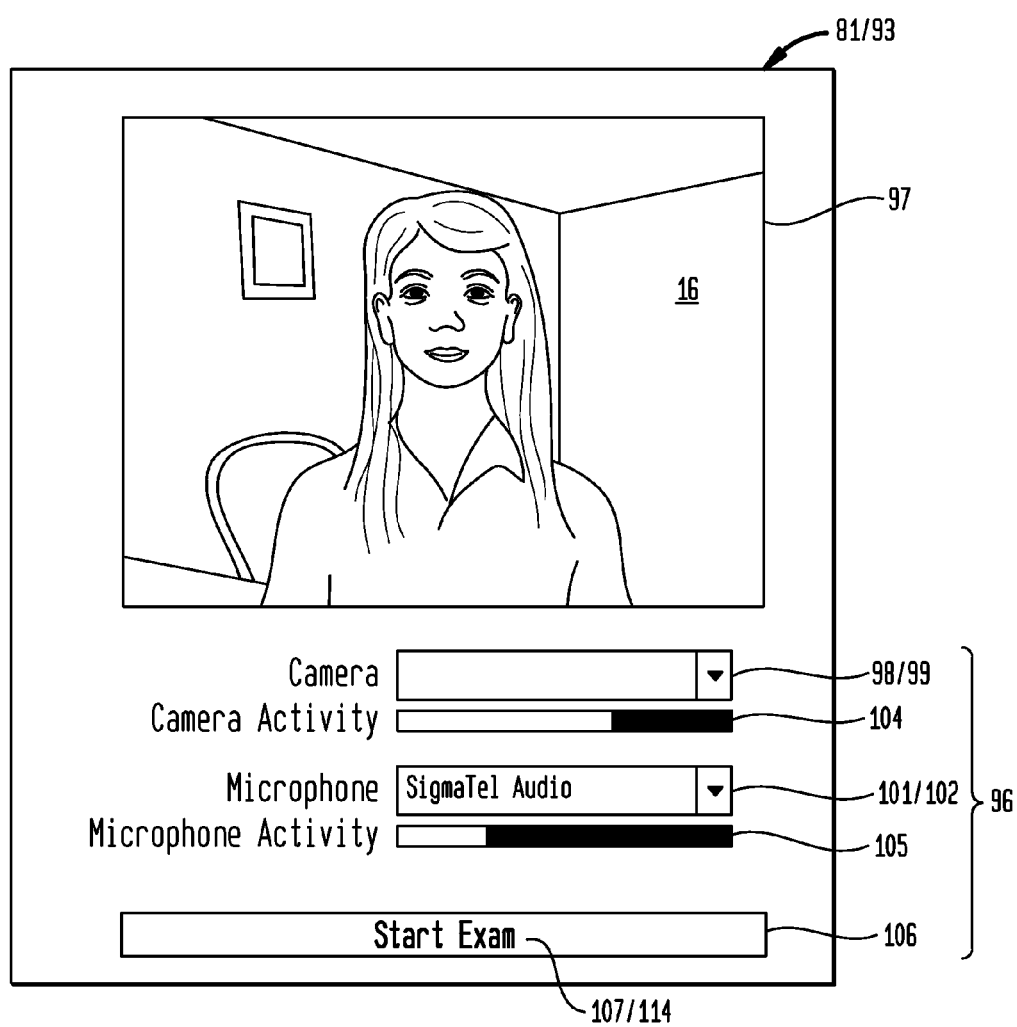

FIG. 9 shows a particular embodiment of the oral examination image area structured to allow an interactive oral examination of the client user.

Figure 10:
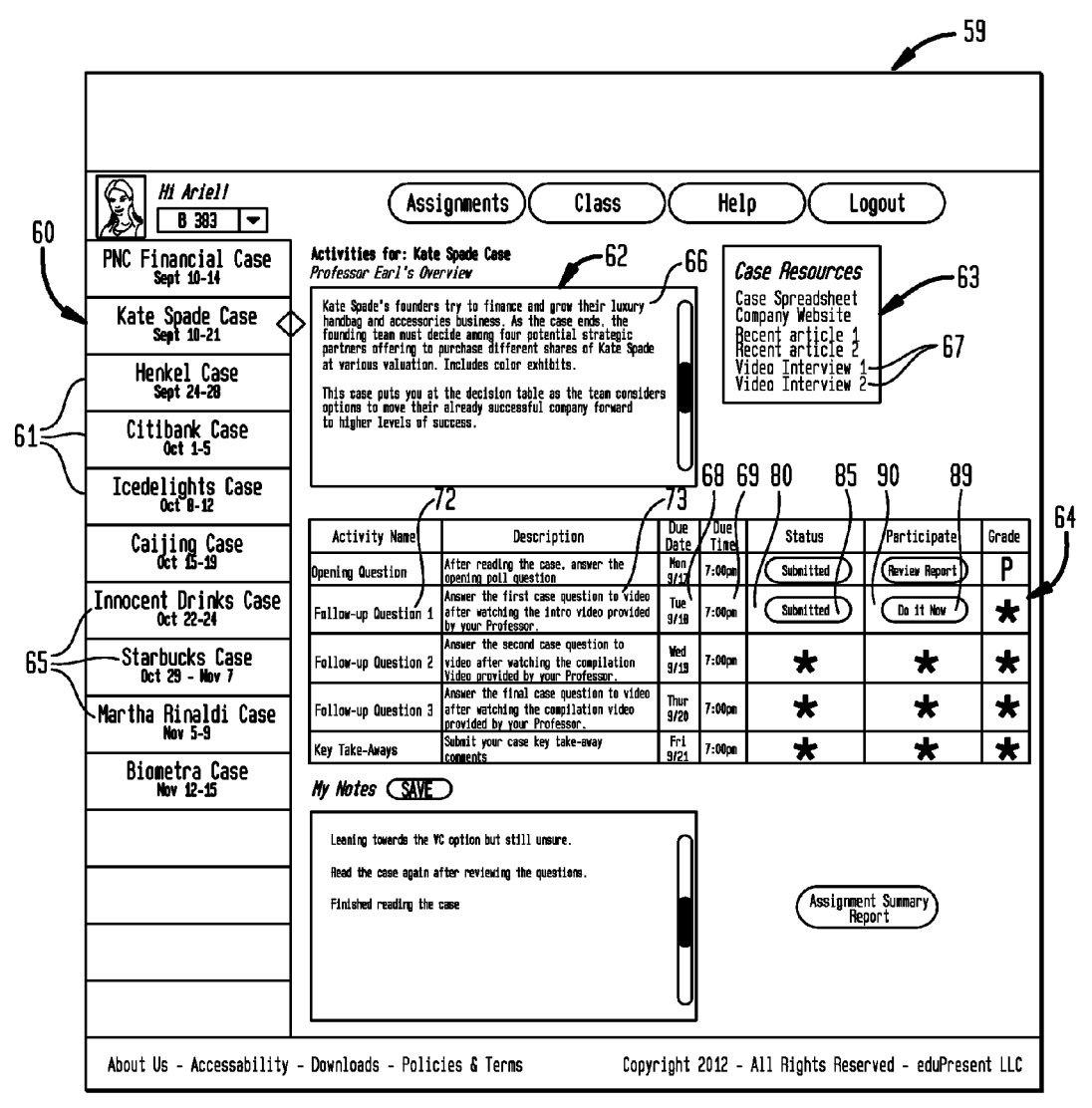

FIG. 10 shows a particular embodiment of a first client graphic user interface which further operates to provide an interactive structure which provides a second prompt in a second assignment event to generate a third client graphic user interface image in the layered multimedia assessment system.

Figure 11:
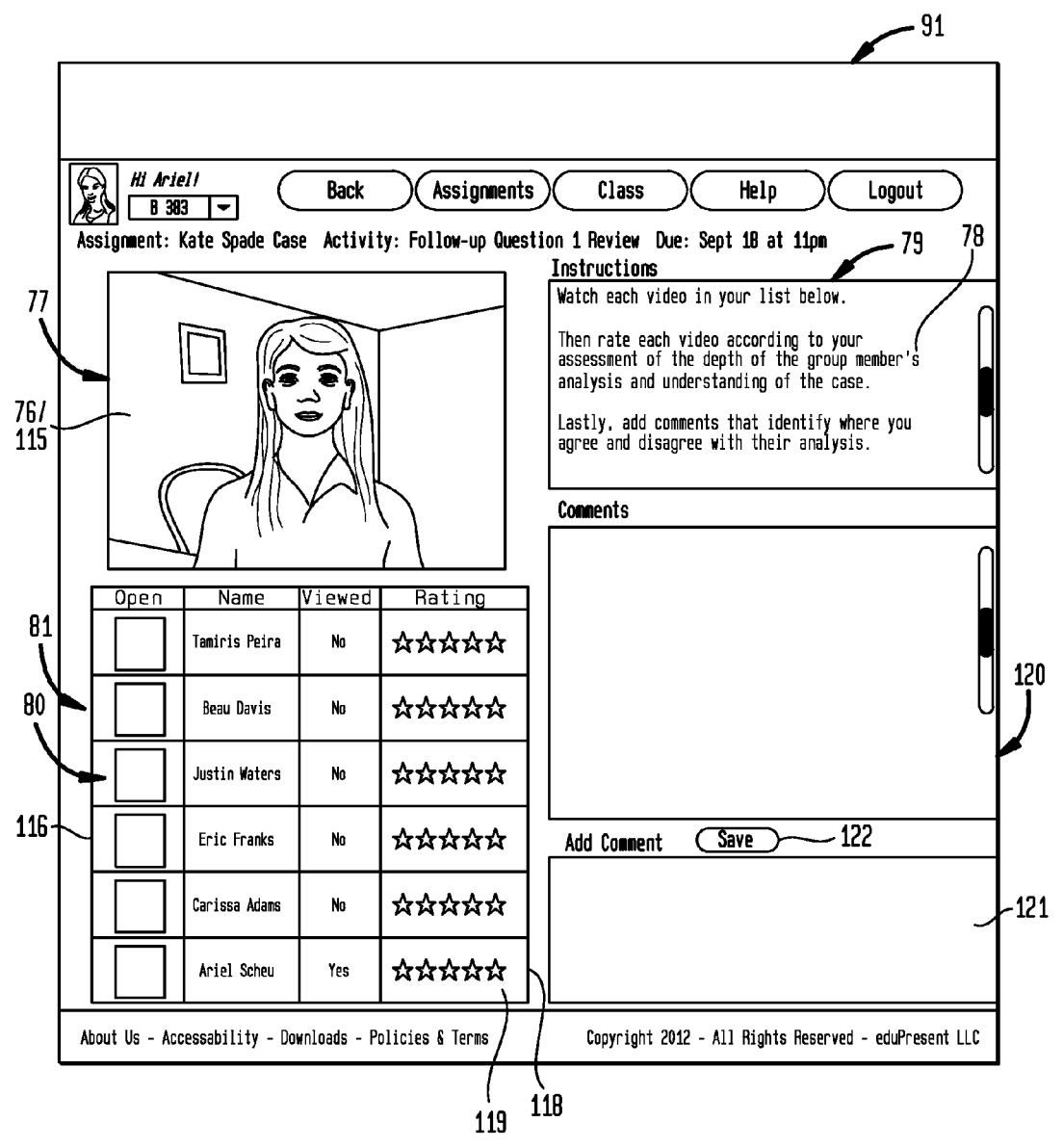

FIG. 11 shows a particular embodiment of a third client graphic user interface which illustrates a format for concurrently displaying a media image area, an instruction image area and interactive examination image area which provides the interactive structure for a participation step which allows the client user to access, evaluate and rate the oral examination of other client users.

V. DETAILED DESCRIPTION OF THE INVENTION

Figure 1:
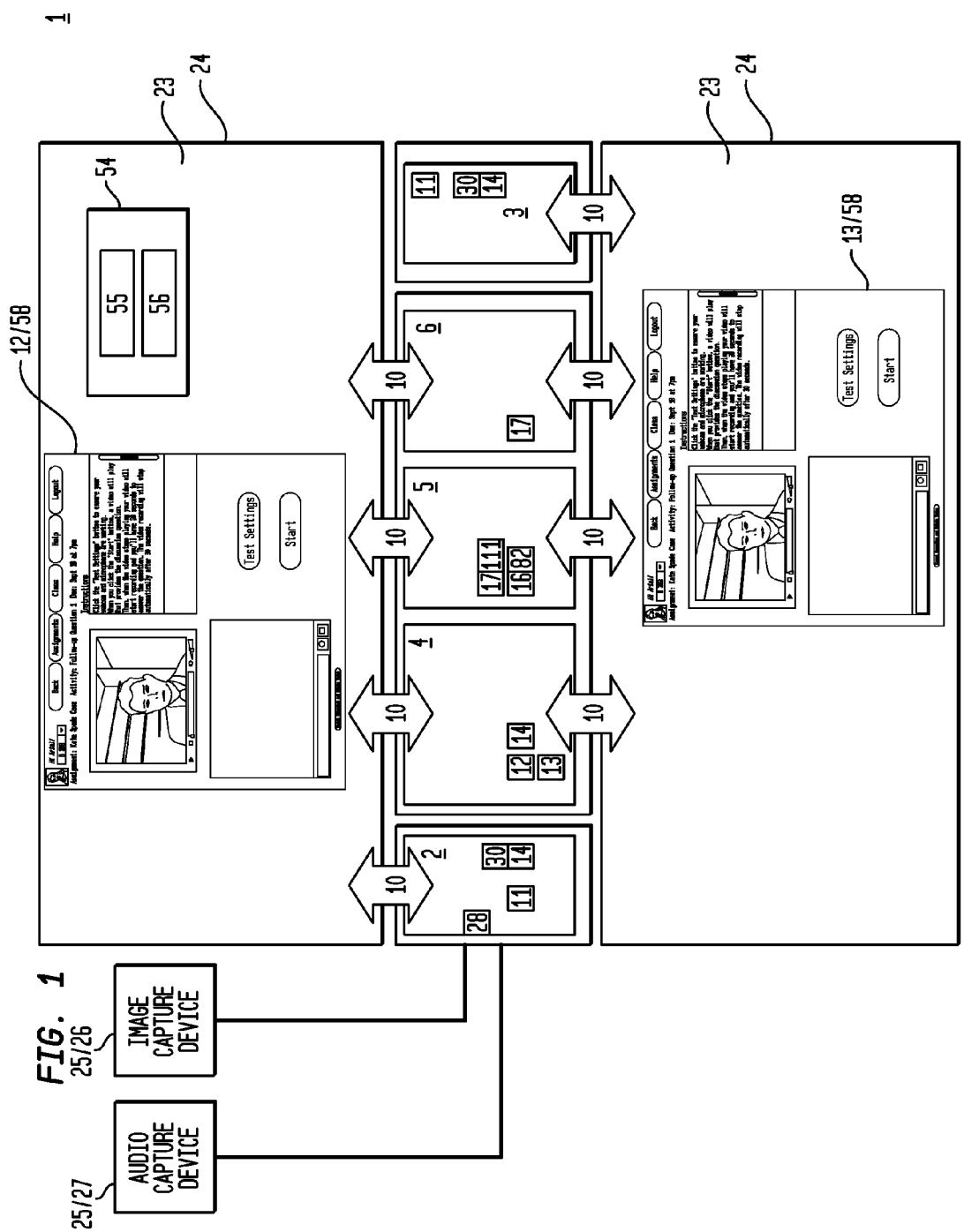
FIG. 1 is a block diagram of a particular embodiment of the inventive layered multimedia assessment system.
Figure 2:
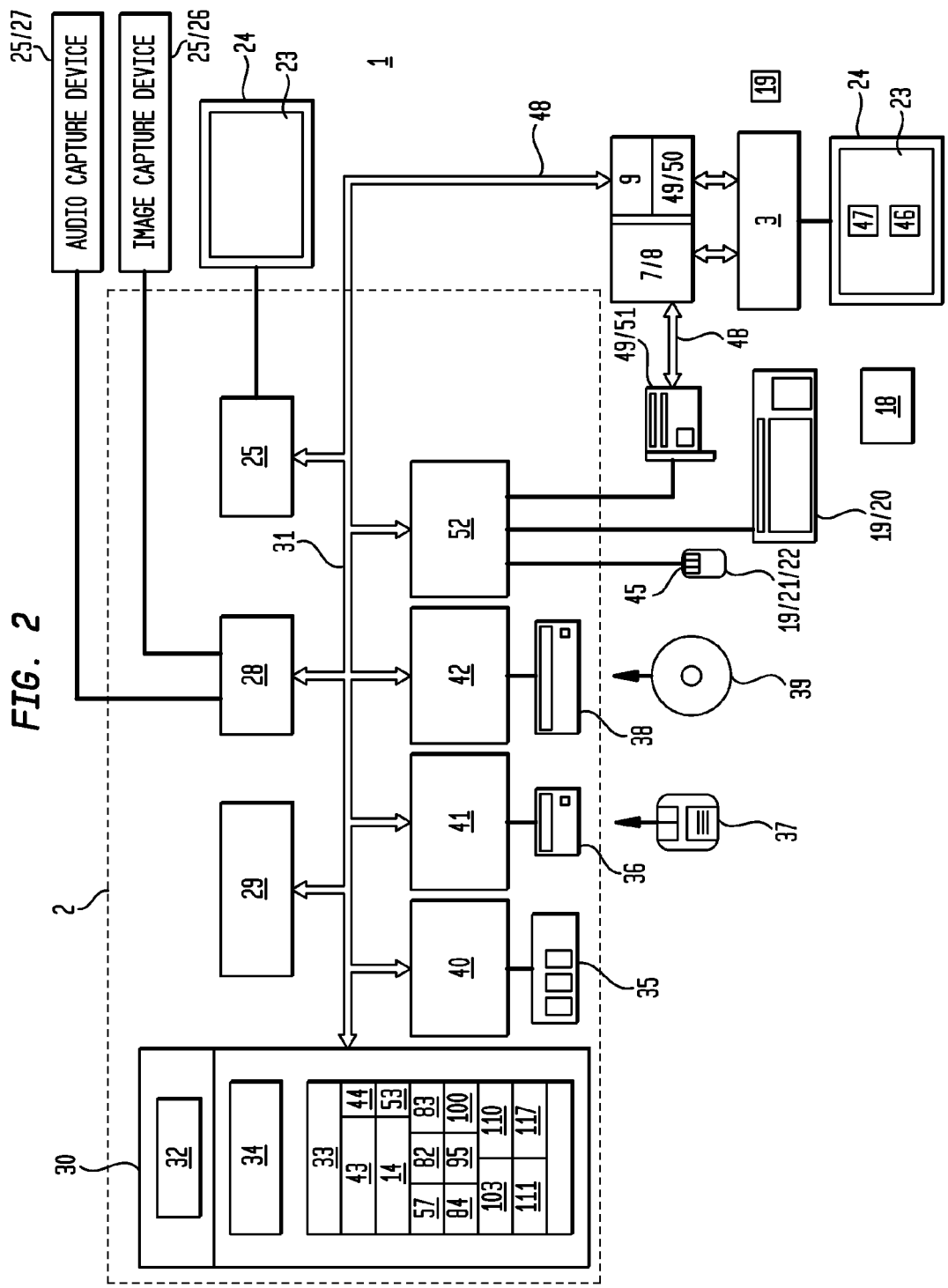
FIG. 2 is a block diagram of an illustrative computer means, network means and computer readable medium which provides computer-executable instructions to implement an embodiment of the layered multimedia assessment system.

Now referring primarily to FIGS. 1 and 2, which generally illustrate computer means, certain network means, and computer readable media which can be utilized to practice embodiments of the inventive layered multimedia assessment system (1). It is not intended that embodiments of the invention be practiced in only wide area computing environments or only in local computing environments, but rather the invention can be practiced in local computing environments or in distributed computing environments where functions or tasks are performed by remote processing devices that are linked through a communications network. In a distributed computing environment, program modules may be located in both a local or in a remote memory storage device(s) or device elements.

Also while a preferred embodiment of the invention is described in the general context of computer-executable instructions such as an application program and program modules which utilize routines, programs, objects, components, data structures, or the like, to perform particular functions or tasks or implement particular abstract data types, or the like, being executed by the computer means and network means, it is not intended that any embodiments of the invention be limited to a particular set of computer-executable instructions or protocols.

Now referring to primarily to FIGS. 1 and 2, one or more client devices (2) and one or more administrator devices (3) can each be configured to connect with one or more server computers (4)(5)(6)(also referred to as "a first server computer (4)" and "a second server computer (5)" and "a third server computer" (6)) through a wide area network (7)("WAN"), such as the Internet (8), or one or more local area networks (9) to transfer corresponding data and images (10). The one or more client devices (2) and the one or more administrator devices (3) can as to particular embodiments take the form of one or more corresponding limited-capability computers designed specifically for navigation on the World Wide Web of the Internet (8). Alternatively, the one or more client devices (2) or the one more administrator devices (3) might be set-top boxes, intelligent televisions connected to receive data through an entertainment medium such as a cable television network or a digital satellite broadcast, handheld devices such as smart phones, slate or pad computers, personal digital assistants or camera/cell phones, or multiprocessor systems, microprocessor-based or programmable consumer electronics, network PCs, minicomputers, mainframe computers, or the like.

Now referring primarily to FIGS. 1 and 2, in general, each of the one or more client devices (2) and the one or more administrator devices (3) can include an Internet browser (11) (also referred to as a "browser") such as Microsoft's INTERNET EXPLORER, GOOGLE CHROME, MOZILLA, FIREFOX, or the like, which functions to download and render multimedia content that is formatted in "hypertext markup language" (HTML). In this environment, a first server computer (4) might be programmed to implement the most significant portions of one or more client user interface(s) (12) or administrator user interfaces (13). As to these embodiments, an application program (14) (also referred to as the "layered multimedia assessment program") which implements the one or more client user interface(s) (12) and the one or more administrator user interfaces (13) can be resident in the first server computer (4) (as shown in the example of FIG. 1) and the one or more client devices (2) and the one or more administrator devices (3) can use the browser (11) to display downloaded content and to relay user inputs back to the first server computer (4). The first server computer (4) would respond by formatting new screen displays for the respective client user interfaces (12) (as shown in the example of FIGS. 3 through 10 further described below).

In other embodiments, the one or more server computers (4)(5)(6) can be used primarily as sources of data or images (10), with primary responsibility for implementing the client user interfaces (12) and the administrator user interfaces (13) being placed upon each of the one or more client devices (2) or each one of the administrator devices (3). As to these embodiments, each of the one or more client devices (2) and each of the one or more administrator devices (3) can run the appropriate portions of the application program (14) implementing the client user interfaces (12) and the administrator user interfaces (13), as further described below.

In an illustrative embodiment of the layered multimedia assessment system (1), a first server computer (4) can be used primarily to store and serve the corresponding portions of the layered multimedia assessment program (14) to the one or more client devices (2) and the one or more administrator devices (3) with the primary responsibility for implementing the client user interface(s)(12) and the administrator user interfaces (13) being placed upon each of the one or more client devices (2) or each of the one or more of the administrator devices (3). Each of the one or more client devices (2) and each one more administrator devices (3) run the appropriate portions of the application program (14) to implement the client user interfaces (12) and the administrator user interfaces (13). A second server computer (5) can be used primarily to record video media images (16) (such as streaming video, progressive video, or the like) (also referred to as a "video image"), conversion of video media to video media files (17) in the appropriate format (such as video file formats), and transfer of the video media files (17) to a third server computer (6). The third server computer (6) can receive, store and retrieve video media files (17). Understandably a greater or fewer server computers can be utilized as necessary or desired. The layered multimedia assessment program (14) operates to provide the graphic user interfaces (12)(13), video media files (17) and data and images (10) from the one or more server computers (4)(5)(6) in a common format which can be displayed in the client user interfaces (12) or the administrator user interfaces (13).

A client user (18) or an administrator user (19) may enter commands and information into a corresponding one or more client devices (2) or administrator devices (3) through input devices (19) such as a keyboard (20) or a pointing device (21) such as a mouse (22); however, any method or device that converts user action into commands and information can be utilized including, but not limited to: a microphone, joystick, game pad, touch screen, or the like. A display surface (23), such as the graphical display surface, provided by a monitor screen or other type of display device (24) can also be connected to the client device (2) or the administrator device (3) by a display interface ( ) (such as a video adapter). The client user interface (12) and the administrator user interface (13) can in part or whole be presented as one or more interactive graphic interfaces on the graphical display surface (23). In addition, each of the one or more client devices (2) or the one or more administrator devices (3) can further include peripheral input devices (25) such as an image capture device (26), for example a camera, video camera, web camera, mobile phone camera, video phone, or the like, and an audio capture device (27) such as microphones, speaker phones, computer microphones, or the like. The audio capture device (27) can be provided separately from or integral with the image capture device (26). The image capture device (26) and the audio capture device (27) can be connected to the client user device (2) or the administrator device (3) by an image capture and an audio capture interface (28).

Now referring primarily to FIG. 2, as a non-limiting example, a client device (2) (encompassed by broken line) can include a processing unit (29), one or more memory elements (30), and a bus (31) (which operably couples components of the client device (2), including without limitation the memory elements (30) to the processing unit (29). The processing unit (29) can comprise one central-processing unit (CPU), or a plurality of processing units which operate in parallel to process digital information. The bus (29) may be any of several types of bus configurations including a memory bus or memory controller, a peripheral bus, and a local bus using any of a variety of bus architectures. The one or more memory elements (30) can without limitation be a read only memory (ROM) (32) or a random access memory (RAM) (33), or both. A basic input/output system (BIOS) (34), containing routines that assist transfer of data between the components of the client device (2), such as during start-up, can be stored in ROM (32). The client device (2) can further include a hard disk drive (35) for reading from and writing to a hard disk (not shown), a magnetic disk drive (36) for reading from or writing to a removable magnetic disk (37), and an optical disk drive (38) for reading from or writing to a removable optical disk (39) such as a CD ROM or other optical media. The hard disk drive (35), magnetic disk drive (36), and optical disk drive (38) can be connected to the bus (31) by a hard disk drive interface (40), a magnetic disk drive interface (41), and an optical disk drive interface (42), respectively. The drives and their associated computer-readable media provide non-volatile storage of computer-readable instructions, data structures, program modules and other data for the client device (2). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments. A number of program modules may be stored on the hard disk drive (35), magnetic disk (37), optical disk (39), ROM (32), or RAM (33), including an operating system (43), one or a plurality of application programs (44) and without limitation the layered multimedia assessment program (14) (to the extent not stored in a remote server computer (4)(5)(6) which implements the client user interface(s) (12) and the administrator user interface(s) (13) or other program interfaces.

A "click event" occurs when the client user (18) or the administrator user (19) operates a application function through the use of a command, for example, pressing or releasing the left mouse button (45) while a pointer icon (46) is located over a control icon (47) (or other interactive field which activates a function) displayed in any one of the client user interfaces (12) or administrator user interfaces (13). However, it is not intended that a "click event" be limited to the press and release of the left mouse button (45) on a mouse (22) while a pointer icon (46) is located over a control icon (47) (or field), rather, a "click event" is intended to broadly encompass a command by the user (18)(19) through which a function of the layered multimedia assessment program (14) (or other program, application, module or the like) which implements the client user interface (12) or the administrator user interface (13) (or other interface) can be activated or performed, whether through selection of one or a plurality of control icon(s) (47) or fields, or by user voice command, keyboard stroke, mouse button, or otherwise. It is further intended that the control icons (47) can be configured or displayed without limitation as a bullets, point, a circle, a triangle, a square, a polygon (or other geometric configurations or combinations or permutations thereof), or as fields or boundary elements created in displayed images, or as fields in which addresses such as a street address, zip code, county code, or natural area code, or inputting a latitude/longitude or projected coordinate X and Y, or other notation, script or character, or the like, can be entered manually or by operation of the layered multimedia assessment program (14), or a portion or element thereof.

The one or more client devices (2) and the one or more administrator devices (3) can operate in a networked environment using one or more logical connections (48) to transfer data and images (10) and to connect to one or more of server computers (4)(5)(6). These logical connections (46) are achieved by one or more communication devices (49) coupled to or a part of the one or more client devices (2) or the one or more administrator devices (3); however, the invention is not limited to a particular type of communications device (49). The logical connections (48) depicted in FIG. 2 can include a local-area network (LAN) (9) or a wide-area network (WAN) (7). Such networking environments are commonplace in offices, enterprise-wide computer networks, intranets, wireless networks, global satellite networks, cellular phone networks and the Internet (8).

When used in a LAN-networking environment, the client device (2) and the administrator device (3) can be connected to the local area network (9) through a LAN-network interface (50), which is one type of communications device (49). When used in a WAN-networking environment, the client device (2) and the administrator device (3) typically each include a modem (51), a type of communications device (49), or any other type of communications device for establishing communications over the wide area network (7), such as the Internet (8). The modem (51), which may be internal or external, can be connected to the bus (31) via a serial port interface (52). In a networked environment, program modules depicted relative to the client device (2) or the administrator device (3), or portions thereof, may be stored in the one or more server computers (4)(5)(6), as above described. It is appreciated that the network connections shown are exemplary and other means of and communications devices for establishing a communications link between the client devices (1), the administrator devices (2) and the server computers (4)(5)(6) can be used.

Now referring again primarily to FIGS. 1 and 2, the client device (2) and the administrator device (3) can encompass a single computer or can encompass a plurality of computers each of which can be operated by a corresponding user (18)(19) which can be without limitation a person or a plurality of persons whether individually, serially or as a group. The user (18)(19) can access the layered multimedia assessment application (14) including the corresponding one or more client user interfaces (12) or the one or more administrator user interfaces (13) to retrieve data and images (10) from one or more server computers (4)(5)(6) in a common format for display on the graphical display surface (23).

Now referring primarily to FIGS. 1 through 10, which provide an illustrative example of a first client user interface (12), in accordance with the invention. The first client user interface (12) can be implemented using various technologies and different devices, depending on the preferences of the designer and the particular efficiencies desired for a given circumstance. In a first step, the client user (18) by click event can activate the layered multimedia assessment program (14). The program (14) functions to provide a login module (53) which can function to generate a conventional login format (54) into which the client user (18) can enter a user name (55) and password (56). The login module (53) functions to verify the user name (55) and password (56) and activates a graphic user interface module (57) which functions to stepwise serially display the client user interface (12) in the form of a plurality of interactive graphic images (58) ordered based on the particular client user (18) and based upon interaction of the particular client user (18) in each of the plurality of interactive graphic images (58).

Again referring primarily to FIG. 3, the first interactive graphic interface image (59) includes one or more of: an assessment selection image area (60) which provides one or more assessment identification areas (61), an assessment overview image area (62), an assessment resources image area (63), and an assignment events interface (64), the content of each entered by the administrator user (19) in a corresponding administrator user interface (13). Accordingly, the administrator user (19) can enter assessment identifiers (65) in the one or more assessment identification areas (61), an assessment overview (66) for display in the assessment overview image area (62), and one or more resource files (67) clickably selectable within the assessment resource image area (63). Entry of the assessment identifiers (65), assessment overview (66), or resource files (67) into the corresponding administrator interface (13) activates the layered multimedia assessment program (14) to correspondingly display the assessment identifiers (65), assessment overview (66), and resource files (66) in the assessment identification areas (61), the assessment overview image area (62), and the assessment resources image area (63) of the first interactive graphic interface image (59) of the client interface (12).

Again referring primarily to FIG. 3, the assignment events interface (64) as displayed in the administrator interface (13) allows entry of a date (68) and a time (69) for corresponding display in a date image area (70) and a time image area (71). The assignment events interface (64) as displayed in the administrator interface (13) further allows entry of an assignment event (72) and assignment event description (73) in the corresponding assignment events image area (74) and the assignment event description image area (75) to be linked or otherwise associated with the date (68) and the time (69) entered by the administrator user (19). The assignment events interface (64) subsequently displayed upon access by the client user (18) includes the date (68) and the time (69) for each corresponding assignment event (72) and assignment event description (73).

Particular embodiments of the assignment events interface (64) operate in the client user interface (12) to provide a two-step process associated with each assignment event (72). In a first step, the client user (18), interactive with the client user interface (12), performs an assessment of assignment content (76) provided in a media image area (77) in accordance with instruction image (78) concurrently provided in an instructions image area (79), and performs an interactive examination (80) concurrently displayed in an interactive examination image area (81) (shown in the example of FIG. 4).

The second step requires the client user (18), interactive with the client user interface (12), to participate in assessment of answers (82) of other client users (18) (whether provided as cumulative data or as a random selection of discrete answers) to the same assignment event (72). The two step process of "performance" and "participation" is described below. The term "answers" for the purposes of this invention encompasses in whole or in part the responsive content to the interactive examination (80) whether provided by click event or by video presentation or otherwise, as further described below.

Again referring primarily to FIGS. 2 and 3, the assignment events interface (64) further includes an assignment status tracker module (83) which functions to compare the actual date and actual time against the dates (68) and times (69) entered by the administrator user (19) and displayed to the client user (18) in the assignment events interface (64) of client user interface (12). A match between the actual date and actual time against the dates (68) and the time (69) entered by the administrator user (19), activates a prompt generator (84) of the layered multimedia assessment program (14) to generate a first prompt (85) ("Do It Now" in the example of FIG. 3) in the first prompt image area (86)(under "Status" in the example of FIG. 3) of the assignment events interface (64). Click event upon the first prompt (84) activates the graphic user interface module (57) which generates a second interactive graphic interface image (87)(as shown in the example of FIG. 4) of the client user interface (12) which relates to the first step of the two-step process associated with each assignment event (72).

Now referring primarily to FIG. 4, the second interactive graphic user interface (87) includes the first media image area (77), the instruction image area (79), and the examination image area (81). All of which correspondingly fill with an instruction image (78), media image (76) and interactive examination image (81) linked to the assignment event (72) by use of the corresponding administrator interface (13) and retrievably stored in the one or more server computers (4)(5)(6) in a common format for graphical display.

The client user (18) can then read the instruction image (78), view the associated media image (76) (shown in the example of FIG. 4 as a video image (16) which can be controllable as to forward, reverse, pause, audio volume and the like) and by click event take the interactive examination (80). The answers (82) associated with the interactive examination can by click event of a save icon (88) be retrievably stored in the one or more server computers (4)(5)(6) and activates the prompt generator (84) of the layered multimedia assessment program (14) to change the first prompt (85) in the first prompt image area (86) to indicate that the assignment event (72) has been completed (show as "Submitted" in the example of FIG. 5). The prompt generator (84), then functions to generate a second prompt (89) in a second prompt image area (90) (show under "Participate" in the example of FIG. 5). The administrator user (19) receives the corresponding change in the first prompt (85) in the administrator user interface (19) which allows access by the administrator user (19) for evaluation of the answers (82) submitted by one or more client users (18).

Now referring primarily to FIGS. 5 and 6, the client user (18) can be returned to the first interactive graphic image (59) in which the prompt generator (84) has generated the second prompt (89) in the second prompt image area (90) (shown as "Do It Now" under "Participate" in the example of FIG. 5). Click event upon the second prompt (89) activates the graphic user interface module (57) which generates a third interactive graphic image (91) of the client user interface (12) which relates to the second step of the two-step process associated with each assignment event (72).

Now referring primarily to FIG. 6, in the participation step, the third interactive graphic user interface (91) includes the media image area (77), the instruction image area (79), and the examination image area (81). All of which correspondingly fill with an instruction image (78), media image (76) and interactive examination image (80) linked to a participation step associated with the assignment event (72) by use of the corresponding administrator interface (13) and retrievably stored in the one or more server computers (4)(5)(6) in a common format for graphical display.

The client user (18) can as above described read the instruction image (78), view the associated media image (76) (in the example of FIG. 6 shown as cumulative results of the interactive examination (80) answers (82) provided by other client users (18) associated with the assignment event (72)) and take interactive examination (80) provided in the examination image area (81) in view of the interactive examination (80) answers (82) provided by other client users (18) associated with the same assignment event (72).

Now referring primarily to FIG. 7, the client user (18) can return to the first interactive graphic user interface (59) for additional prompts (85)(89) (similar to those shown in the example of FIG. 5) for subsequent assignment events (72) each including the first step and the second step of the process as above described. In the assignment event (72), as shown in the example of FIG. 7, the client user (18) can by click event select the first prompt (84) to again generate the second interactive graphic user interface (87).

Now referring primarily to FIG. 8, the second interactive graphic user interface (87) can as above described provide the media image area (77), an instruction image area (79), and an interactive examination image area (81). As to this embodiment of the second interactive graphic user interface (87), the media image area (77) displays a video image (92) and the instruction image area (79) displays an instruction image (78) which instructs on assessing the video image (92) and taking the interactive examination (81) in the form of an oral examination (93).

The second interactive graphic user interface (87) can further provide an oral examination image control (96) (shown in the example of FIG. 8 as a "Test Settings" button and in the example of FIG. 9 as clickably selectable features of an oral examination image display area (97)) which by click event activates an oral examination module (95) of the layered multimedia assessment program (14). The oral examination module (95) functions in part to display in the interactive examination image area (81) the oral examination image display area (97). Video media images (16) captured by one or more image capture devices (26), as above described, can be displayed in the oral examination image display area (97) along with audio captured by one or more audio capture devices (27).

Now referring primarily to FIG. 9, the oral examination image control (96) can further include an image capture device selector (98) which can be the form of an image capture device selection icon (99) for a drop down list which by click event activates an image capture selection device module (100) which allows the client user (19) to select one of a plurality of image capture devices (26) (such as "video camera").

Similarly, the oral examination control (96) can further provide an audio capture device selector (101) which can be in the form of an audio capture device selection icon (102) for a drop list (such as "microphone") which by click event activates an audio capture selection device module (103) which allows the client user (18) to select one of a plurality of audio capture devices (27), as above described.

The oral examination image control (96) can further provide an image capture activity indicator (104) (shown as a horizontal field and image capture activity indicia in the example of FIG. 9) and an audio capture activity indicator (105) (shown as a horizontal field and audio capture activity indicia in the example of FIG. 9).

The oral examination image control (96) can further provide an oral examination initiation control (106) which can be in the form of an initiate oral examination icon (107) (shown as a "Start" icon in the examples of FIG. 8 and FIG. 9) which by click event activates the oral examination module (95). While the embodiment shown in FIG. 8 provides an instruction that states "when the video stops playing you video will start recording and you'll have 30 seconds to answer the question" presented by the video image (92) displayed in the media image area (77); this is not intended to limit the invention to only this particular method of oral examination.

As shown in the examples of FIGS. 8 and 9, the media image area (77) can as to particular embodiments provide a query image display area (108) in which one or more query images (109) can be generated in serial order by operation of the oral examination module (95). Upon presentation of each query image (109) in the query image display area (108), the oral examination module (95) activates a recording module (110) which records the captured video media images (16) (both image and audio) including the client user's (18) answer (82) to the query image (109) to a video media file (17) as an oral examination file (111). The oral examination file (111) can be stored in the client device (2) and encoded and converted to a common file format and stored either by the client device (2) or by the one or more server computers (4)(5)(6), as above described. The oral examination module (95) can upon presentation of each query image (109) generate a timer image (112) proximate the oral examination image display area (97) which allots and counts down a period of time in which the client user (18) can provide an answer (82) to the query image (109). A recording indicator (113) can be generated proximate the timer image (112) to indicate to the client user (18) that the video media (16) is being recorded. The oral examination module (95) can further generate a terminate oral examination icon (114) (for example "end answer" which can presented over the initiate oral examination icon (107)) which upon click event activates the oral examination module (95) to terminate recording of the video media (16) for the query image (109). The oral examination module (95) can further function to display the next query image (109), reset the timer image (112) to allocate and count down a period of time in which the client user (18) can answer the displayed query image (109), as above described. Upon elapse of the period of time in which the client user (18) can answer the last of the one or more inquiry images (109), the oral examination module (95) can further function to turn off the image capture device (26) and the audio capture device (27).

Now referring to FIG. 10, the client user (18) can be returned to the first interactive graphic interface image (59) in which the prompt generator (84) has generated the second prompt (89) in the second prompt image area (90) ("Do It Now" under "Participate"). Click event upon the second prompt (89) activates the graphic user interface module (57) which generates the third interactive graphic user interface image (91) of the client user interface (13) which relates to the second step of the two-step process associated with each assignment event (72).

Now referring to FIG. 11, the third interactive graphic user interface image (91) can as above described provide the media image area (77), the instruction image area (79), and the interactive examination image area (81). All of which correspondingly fill with an instruction image (78), media image (76) and interactive examination image (80) linked to the participation step associated with the assignment event (72) by use of the corresponding administrator interface (13) and retrievably stored in the one or more server computers (4)(5)(6) in a common format for graphical display.

As to this embodiment of the third interactive graphic user interface (91), the media image area (77) displays one or more a video images (115) from the oral examination files (111) of other client users (18) that took the oral examination (93) for the same assignment event (72). The instruction image area (79) displays and instruction image (78) providing instructions for assessing the one or more video images (113) of other client users (18). The interactive examination image area (81) displays a video image selector (116) which allows selection of the one or more oral examination files (111) of other client users (18) by click event to display one or more video images (115). The application program (14) can further include a video image valuation module (117) which generates a value element display area (118) (proximate "Rating" in the example of FIG. 11). The client user (18) can enter a value element image (119) (such as a letter grade A, B, C or the like, or numerical value 1, 2, 3, 4 or the like, or a word such as excellent, average, poor or the like, or one or more symbols such as a five star rating system as shown for example in FIG. 11) in the value element display area (118).

The interactive examination image area (81) can further display a annotation area (120) (shown in the example of FIG. 11 as a "Comments" and "Add Comment" image area) in which annotations (121) related to each of the one or more video images (115) can be entered. The value element image (118) and the annotations (121) can be associated with each of the one more video images (115) and saved to the client device (2), the administrator device (3), or the one or more of the server computers (4)(5)(6) by use of a save value element control (122) (shown in the example of FIG. 11 as a "Save" icon).

As can be easily understood from the foregoing, the basic concepts of the present invention may be embodied in a variety of ways. The invention involves numerous and varied embodiments of a computer implemented layered multimedia assessment system or specialized computer system having a layered multimedia assessment program and methods for making and using such system(s) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "computer" should be understood to encompass disclosure of the act of "computing"—whether explicitly discussed or not—and, conversely, were there effectively disclosure of the act of "computing", such a disclosure should be understood to encompass disclosure of a "computer" and even a "means for computing." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the layered multimedia assessment systems herein disclosed and described, ii) the related methods disclosed and described, iii) similar, equivalent, and even implicit variations of each of these devices and methods, iv)

those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A method, comprising:
   displaying a first interactive graphic interface image on a graphical display surface of a first computer, including:
      a first media image area displaying a media presentation;
      a query image area displaying, in serial order, a plurality of queries related to said media presentation;
      a first instruction image area which displays instructions, wherein said media presentation, said plurality of queries, and said instructions relate to an oral examination of a selected by a first client user; and
      a first or examination image area to display a recorded oral examination image including a video and associated audio of said first client user answering at least one of said plurality of queries,
   wherein response to an initiation of said oral examination by said first client user by interacting with said first interactive graphic interface image, said media presentation is displayed to completion in said first media image area, wherein subsequent to said media presentation being displayed, at least one of said plurality of queries is serially displayed in said query image area, and subsequent to the display of said at least one query, initiating a recording of said video and associated audio while simultaneously displaying to said first client user said video and associated audio in said first oral examination image area.

2. The method of claim 1, further comprising displaying a timer image in said a first interactive graphic interface image which counts down time allocated to said first client user to answer said at least one of said plurality of queries.

3. The method of claim 2, further comprising displaying a recording indicator in said first interactive graphic interface image which indicates to the first client user recording of said video and associated audio.

4. The method of claim 3, further comprising displaying an oral examination termination control which upon first client user interaction terminates recording of said video and associated audio.

5. The method of claim 4, further comprising:
   displaying a second interactive graphic interface image on a graphical display surface of a second computer, including:
      a second media image area displaying said oral examination image including said video and associated audio of said first client user answering said at least one of said query images displayed in said query image area;
      a second instruction image area displaying instructions to rate said oral examination of said first client user; and
      an oral examination valuation display area which by interaction of a second client user rates said oral examination of said first client user.

6. The method of claim 5, further comprising displaying an oral examination image selector which by user interaction allows selection of one of a plurality of said oral examination images for display in said second media image area.

7. The method of claim 6, further comprising displaying an oral examination valuation element entered by said second client user.

8. The method of claim 7, further comprising displaying an annotation display area which by second client user interaction allows entry of annotations coupled to said oral examination image.

9. The method of claim 1, further comprising:
   displaying a third interactive graphic interface image on said graphical display surface of said second computer, including:
      said first media image area fillable by interaction of said second client user with said media presentation for display in said media image area of said first interactive graphic interface image on said graphical display surface of said first computer;
      said first instruction image area fillable by interaction of said second client user with said instructions for display in said first interactive graphic interface image on said graphical display surface of said first computer;
      said query image area fillable by interaction of said second client user with said plurality of queries relating to said media presentation; and said first oral examination image area fillable by initiation of said oral examination by said first client user with said oral examination image including said recording of said video and associated audio of said first client user answering said at least one of said plurality of queries displayed in said query image area.

* * * * *